(12) United States Patent
Beeson

(10) Patent No.: US 9,732,872 B2
(45) Date of Patent: Aug. 15, 2017

(54) FUEL FLOAT VALVE

(71) Applicant: Hamilton Sundstrand Corporation, Windsor Locks, CT (US)

(72) Inventor: William Beeson, West Hartford, CT (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 0 days.

(21) Appl. No.: 14/640,153

(22) Filed: Mar. 6, 2015

(65) Prior Publication Data

US 2015/0176716 A1 Jun. 25, 2015

Related U.S. Application Data

(62) Division of application No. 13/157,410, filed on Jun. 10, 2011, now Pat. No. 8,997,780.

(51) Int. Cl.
| | |
|---|---|
| *F16K 31/18* | (2006.01) |
| *F16K 24/04* | (2006.01) |
| *B64D 37/32* | (2006.01) |
| *F16K 31/22* | (2006.01) |
| *F16K 31/26* | (2006.01) |

(52) U.S. Cl.
CPC ............ *F16K 24/048* (2013.01); *B64D 37/32* (2013.01); *F16K 31/22* (2013.01); *F16K 31/26* (2013.01); *Y10T 137/0318* (2015.04); *Y10T 137/3099* (2015.04); *Y10T 137/7358* (2015.04); *Y10T 137/7485* (2015.04); *Y10T 137/86847* (2015.04); *Y10T 137/8803* (2015.04)

(58) Field of Classification Search
CPC ......... Y10T 137/7358; Y10T 137/7423; Y10T 137/7436; Y10T 137/7439; Y10T 137/3099; Y10T 137/309; Y10T 137/3084; Y10T 137/0525; Y10T 137/6004; Y10T 137/7485; Y10T 137/86847; Y10T 137/0318; Y10T 137/8803; B64D 37/32; F16K 31/22; F16K 31/26; F16K 24/048
USPC ....... 137/15.26, 171, 197, 199, 202, 315.08, 137/409, 429, 433, 434, 442, 448; 220/88.3; 73/309, 319
See application file for complete search history.

(56) References Cited

U.S. PATENT DOCUMENTS

| | | | | |
|---|---|---|---|---|
| 250,076 | A | * | 11/1881 | Kessler .................. F04B 49/04 137/428 |
| 860,165 | A | * | 7/1907 | Vincent .................... F22D 5/22 137/433 |

(Continued)

OTHER PUBLICATIONS

EP Search Report for Application No. 12170612.1 dated Nov. 6, 2012.

*Primary Examiner* — Craig J Price
(74) *Attorney, Agent, or Firm* — Carlson, Gaskey & Olds, P.C.

(57) ABSTRACT

A fuel system includes a fuel tank that has a wall with an opening. A fuel float valve includes a float and a seal plate that are arranged on opposing ends of a beam. A support carries a connection of the beam. The beam is configured to translate along the support at the connection in response to a changing fuel level. The fuel float valve is movable between first and second positions in which the seal plate is respectively unsealed and sealed relative to the opening. The seal plate is movable relative to the opening in the second position.

4 Claims, 2 Drawing Sheets

(56) References Cited

U.S. PATENT DOCUMENTS

| | | | | |
|---|---|---|---|---|
| 866,045 | A | 4/1908 | Ehrlich et al. | |
| 972,738 | A * | 10/1910 | Townsend | F16K 31/22 119/80 |
| 1,038,685 | A | 9/1912 | Titus et al. | |
| 1,119,979 | A * | 12/1914 | Mulligan | F16K 24/044 137/202 |
| 1,323,168 | A | 11/1919 | DeRigne | |
| 1,665,394 | A | 4/1928 | Willoughby | |
| 1,959,644 | A | 5/1934 | Richardson | |
| 2,549,409 | A | 4/1951 | Atkinson | |
| 2,569,110 | A * | 9/1951 | McGillis | G05D 9/02 137/416 |
| 2,673,618 | A | 3/1954 | Batchelder | |
| 2,689,461 | A | 9/1954 | Brandon | |
| 2,699,653 | A * | 1/1955 | Ponsar | G05D 9/02 137/403 |
| 2,870,936 | A | 1/1959 | Clayton | |
| 3,559,679 | A | 2/1971 | Smirra | |
| 3,587,618 | A | 6/1971 | Kenyon | |
| 3,590,559 | A * | 7/1971 | Bragg | B64D 37/32 220/88.3 |
| 3,691,730 | A | 9/1972 | Hickey et al. | |
| 3,710,549 | A | 1/1973 | Nichols et al. | |
| 3,732,668 | A * | 5/1973 | Nichols | B64D 37/32 220/88.3 |
| 3,788,039 | A * | 1/1974 | Bragg | B64D 37/32 220/88.3 |
| 4,095,614 | A | 6/1978 | Marmon | |
| 4,149,372 | A | 4/1979 | Gavin et al. | |
| 4,376,446 | A * | 3/1983 | Liff | B60K 15/03519 137/202 |
| 4,378,920 | A | 4/1983 | Runnels et al. | |
| 5,031,655 | A | 7/1991 | Hebaus | |
| 5,062,444 | A * | 11/1991 | Bergsma | B60K 15/03519 137/202 |
| 5,172,714 | A | 12/1992 | Kobayashi et al. | |
| 5,193,579 | A | 3/1993 | Bauer et al. | |
| 5,241,983 | A | 9/1993 | Lagache | |
| 5,782,258 | A | 7/1998 | Herbon et al. | |
| 6,234,195 | B1 | 5/2001 | Kippe et al. | |
| 6,564,820 | B2 | 5/2003 | Christman | |
| 6,634,598 | B2 | 10/2003 | Susko | |
| 6,837,256 | B2 | 1/2005 | Benjay | |
| 6,851,255 | B2 | 2/2005 | Aitchison et al. | |
| 7,013,905 | B2 | 3/2006 | Jones et al. | |
| 7,073,530 | B2 | 7/2006 | Pyle et al. | |
| 7,114,519 | B2 | 10/2006 | Aitchison et al. | |
| 7,481,237 | B2 | 1/2009 | Jones et al. | |
| 7,621,483 | B2 * | 11/2009 | Cozens | B64D 37/14 137/589 |
| 7,918,358 | B2 | 4/2011 | Gupta | |
| 7,971,828 | B2 | 7/2011 | Massey et al. | |
| 8,074,932 | B2 | 12/2011 | Surawski | |
| 8,596,289 | B2 * | 12/2013 | Krug | B64D 37/32 137/15.26 |
| 8,789,794 | B2 * | 7/2014 | Krug | B64D 37/32 137/447 |
| 2014/0027575 | A1 | 1/2014 | Goto | |

\* cited by examiner

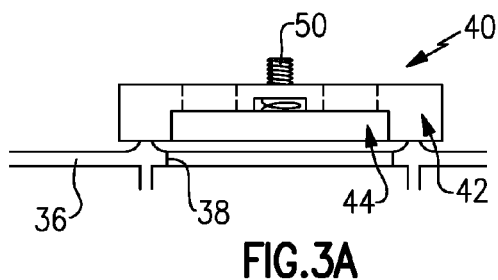
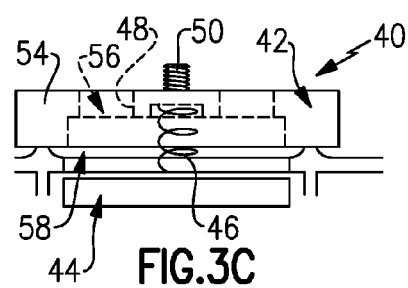
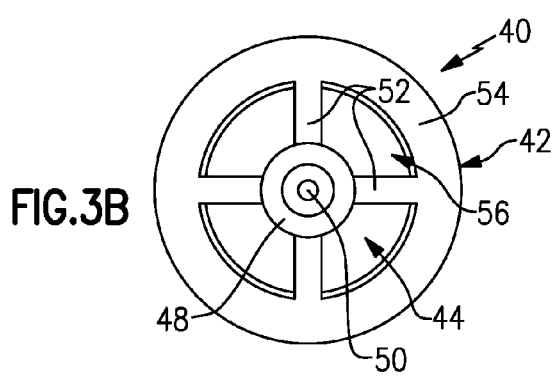
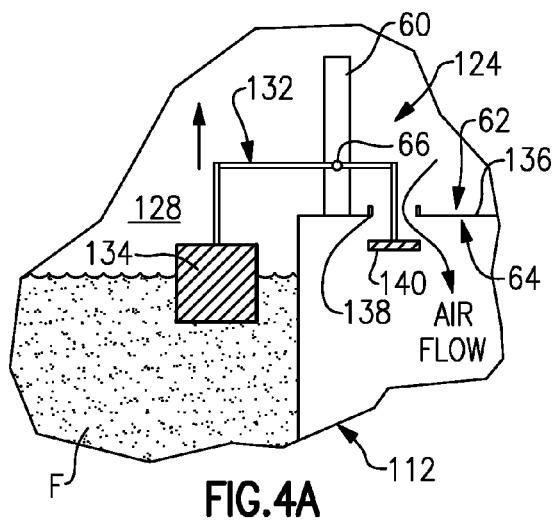
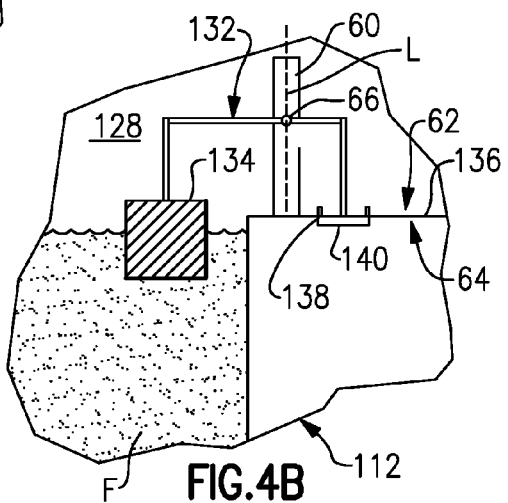

FUEL FLOAT VALVE

CROSS-REFERENCE TO RELATED APPLICATIONS

This disclosure is a divisional of U.S. patent application Ser. No. 13/157,410 filed Jun. 10, 2011.

BACKGROUND

This disclosure relates to a fuel float valve. More particularly, the disclosure relates to a fuel float valve for use in an aircraft fuel system.

One typical fuel system for an aircraft includes multiple fuel tanks. A surge tank is fluidly connected to at least one of the fuel tanks. A nitrogen generation system provides nitrogen to the fuel tanks to fill any gaseous cavities with inert gas.

A fuel float valve is arranged in one of the fuel tanks to selectively vent gases from the fuel tank to the surge tank. One type of fuel float valve is a flapper valve in which a float is arranged on one side of a beam and a plate is arranged on the other side of the beam. The beam pivots about a fulcrum. As the fuel level rises within the tank, the flapper valve pivots to seal an opening in a wall in the fuel tank with the plate. The plate blocks fluid flow from the fuel tank to the surge tank, for example, during turning maneuvers.

Under some conditions, the plate may undesirably remain sealed against the wall after the fuel level falls. For example, the nitrogen generation system may generate enough pressure in some circumstances to maintain the plate in the closed position. However, the fuel tank should again be permitted to vent to the surge tank.

SUMMARY

In one exemplary embodiment, a fuel system includes a fuel tank that has a wall with an opening. A fuel float valve includes a float and a seal plate that are arranged on opposing ends of a beam. A support carries a connection of the beam. The beam is configured to translate along the support at the connection in response to a changing fuel level. The fuel float valve is movable between first and second positions in which the seal plate is respectively unsealed and sealed relative to the opening. The seal plate is movable relative to the opening in the second position.

In a further embodiment of any of the above, the support provides a linear path.

In a further embodiment of any of the above, the wall separates first and second sides. The fuel tank includes a cavity and the first side is arranged in the cavity. The plate is on the second side outside the cavity.

In a further embodiment of any of the above, the float is arranged in the cavity.

In a further embodiment of any of the above, the float and the seal plate are arranged on opposing sides of the connection on the beam.

In a further embodiment of any of the above, a surge tank is fluidly connected to the fuel tank by a vent line. The seal plate blocks flow between the fuel and surge tanks in the sealed position.

In a further embodiment of any of the above, a nitrogen gas system is fluidly connected to the fuel tank at the first side of the opening. The surge tank is at a second side of the opening opposite the first side.

In another exemplary embodiment, a method of regulating fluid flow through a fuel tank includes the steps of moving a float and a plate in response to a changing fuel level, blocking an opening in a wall with the plate to provide a sealed condition and unobstructing the opening with a portion of the plate in the sealed condition.

BRIEF DESCRIPTION OF THE DRAWINGS

The disclosure can be further understood by reference to the following detailed description when considered in connection with the accompanying drawings wherein:

FIG. 3A is a schematic view of a plate illustrated in FIG. 2B in a closed position.

FIG. 3B is an elevational view of the plate illustrated in FIG. 3A.

FIG. 3C is a schematic view of the plate illustrated in FIG. 3A in an open position.

FIG. 4A is a schematic view of another fuel float valve in an unsealed position at a first fuel level.

FIG. 4B is a schematic view of the fuel float valve shown in FIG. 4A in the sealed position at a second fuel level that is greater than the first level.

DETAILED DESCRIPTION

Figure 1:
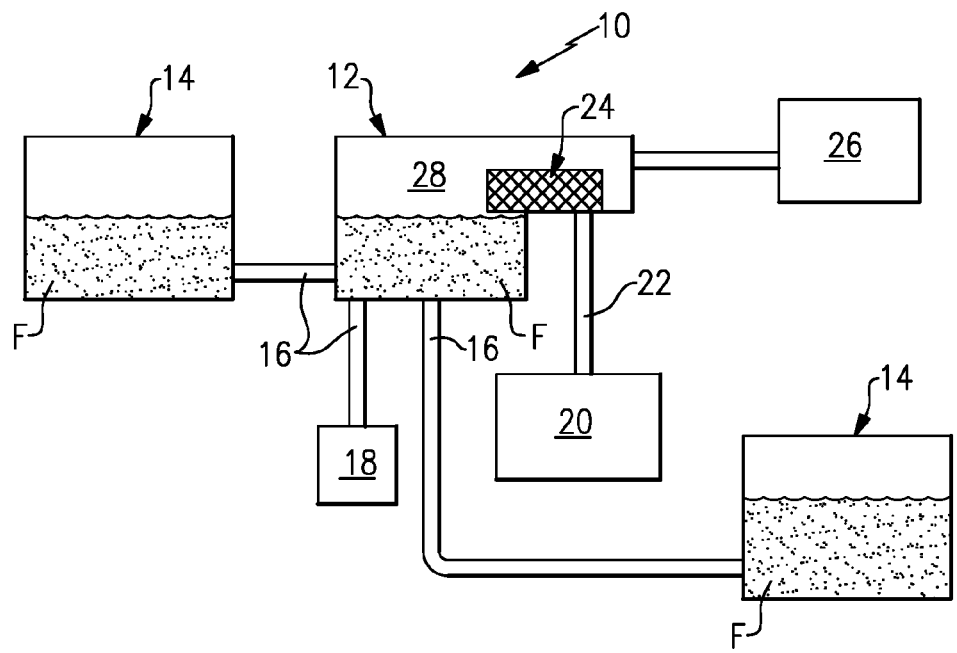
FIG. 1 is a schematic view of a fuel system.

A fuel system 10 is schematically illustrated in FIG. 1. The system 10 is typical of an aircraft fuel system, and includes a center tank 12 fluidly connected to lateral tanks 14 by fuel lines 16. The fuel system 10 supplies fuel F to a component 18, such as a gas turbine engine.

A surge tank 20 is fluidly connected to at least one of the tanks, such as the center tank 12, by a vent line 22. A nitrogen generation system 26 is fluidly connected to the center tank 12 to provide nitrogen gas to the fuel system 10 to fill the gaseous cavities within the tanks with inert gas, such as cavity 28 in the center tank 12.

A fuel float valve 24 selectively regulates the flow of gases from the cavity 28 to the surge tank 20. As the level of fuel F within the center tank 12 rises, the fuel flow valve 24 will close to block fuel flow from the center tank 12 to the surge tank 20, thus preventing fuel from pouring into the surge tank 20.

It is desirable to prevent the fuel float valve from becoming stuck in a closed or sealed position even after the fuel level decreases. A stuck valve can prevent proper venting of the center tank 12 to the surge tank 20. To this end, the fuel float valve 24 includes a feature for insuring that it can still vent even if it becomes stuck.

Figure 2A:
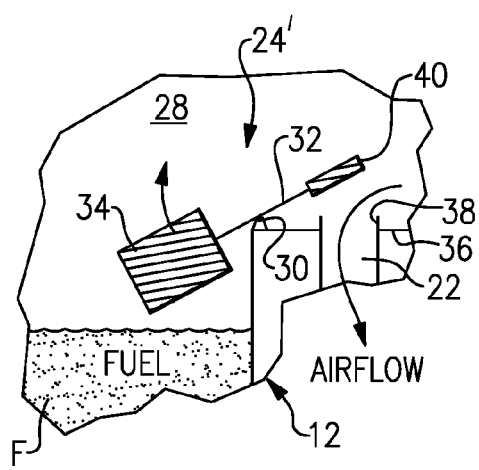
FIG. 2A is a schematic view of an example fuel float valve in an unsealed position at a first fuel level.
Figure 2B:
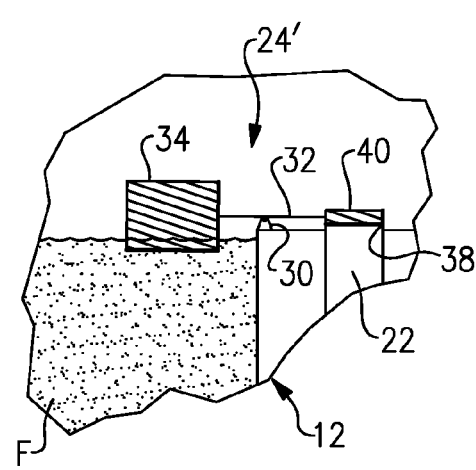
FIG. 2B is a schematic view of the fuel float valve illustrated in FIG. 2A in a sealed position at a second fuel level that is greater than the first level.

The fuel float valve 24' includes a beam 32 having a float 34 and a plate 40 at opposing ends, as illustrated in FIGS. 2A-2B. The beam 32 pivots about a fulcrum 30. The plate 40 selectively blocks an opening 38 in a wall 36 of the center tank 12. The opening 38 fluidly connects the center tank 12 to the surge tank 20. Flow through the opening 38 is blocked in a closed position with the plate 40 sealed against the wall 36.

Referring to FIGS. 3A-3C, the plate 40 includes first and second portions 42, 44 that are moveable relative to one another. The first portion 42 includes a central support 48 having a fastener 50 that secures the plate 40 to the beam 32. Legs 52 extend radially from the central support 48 and are interconnected to an annular portion 54, which provides a sealing surface configured to seal against the wall 36. Spaces 56 are provided between the central support 48, legs 52 and annular portion 54. The second portion 44 blocks the spaces 56 in a closed position (FIG. 3A).

A biasing member 46, such as a spring, urges the second portion 44 to the closed position relative to the first portion 42. In response to a predetermined pressure differential across the plate 40, the force of the biasing spring is overcome permitting the second portion 44 to move out of engagement with the first portion 42, creating a gap 58. The gap 58 permits fluid flow through the plate 40 even with the first portion 42 sealed against the wall 36. Thus, the second portion 44 acts as a relief valve in the plate 40 should become stuck closed.

Another fuel float valve 124 is illustrated in FIG. 4A-4B. A guide or support 60 is mounted within the cavity 128 of the fuel tank 112. The fuel float valve 124 includes a beam 132 that supports a float 134 and a plate 140 at opposing ends. The beam 132 is supported for translation by the support 60 at a connection 66. In one example, the support 60 provides a linear path L along which the fuel float valve 124 moves vertically in response to changes in the fuel level, as illustrated in the figures. The wall 136 defines first and second sides 62, 64. The first side 62 is provided within the cavity 128. The plate 140 is arranged on the second side 64, which is unpressurized, preventing an increased pressure from the nitrogen generation system from holding the plate 140 in a closed position. Rising pressure within the cavity 128 will force the plate out of engagement with the wall 136, and unobstruct the opening 138.

Although an example embodiment has been disclosed, a worker of ordinary skill in this art would recognize that certain modifications would come within the scope of the claims. For that reason, the following claims should be studied to determine their true scope and content.

What is claimed is:

1. A fuel system comprising:
   a fuel tank having a wall with an opening;
   a fuel float valve including a float and a seal plate on opposing free ends of a beam, and a support carrying a connection of the beam, the beam is configured to translate along the support at the connection in response to a changing fuel level, and wherein the float and the seal plate are configured to translate linearly with the beam, the fuel float valve is movable between first and second positions in which the seal plate is respectively arranged in unsealed and sealed positions relative to the opening;
   wherein the seal plate is movable relative to the opening in the second position;
   wherein the wall separates first and second sides, the first tank including a cavity and the first side arranged in the cavity, the plate on the second side outside the cavity;
   a surge tank fluidly connected to the fuel tank by a vent line, the seal plate blocking flow between the fuel tank and the surge tank in the sealed position; and
   a nitrogen gas system fluidly connected to the fuel tank at a first side of the opening, the surge tank at a second side of the opening opposite the first side.

2. The fuel system according to claim 1, wherein the support provides a linear path.

3. The fuel system according to claim 1, wherein the float is arranged in the cavity.

4. The fuel system according to claim 3, wherein the float and the seal plate are arranged on opposing sides of the connection on the beam.

\* \* \* \* \*

UNITED STATES PATENT AND TRADEMARK OFFICE
CERTIFICATE OF CORRECTION

PATENT NO. : 9,732,872 B2  
APPLICATION NO. : 14/640153  
DATED : August 15, 2017  
INVENTOR(S) : William Beeson Page 1 of 1

It is certified that error appears in the above-identified patent and that said Letters Patent is hereby corrected as shown below:

In the Claims

In Claim 1, Column 4, Line 18; after "second sides," replace "the first" with --the fuel--

Signed and Sealed this  
Fourth Day of December, 2018

Andrei Iancu  
*Director of the United States Patent and Trademark Office*